United States Patent [19]

Dear et al.

[11] 3,914,319

[45] Oct. 21, 1975

[54] BISTHIOALKYL GLYCOLS

[75] Inventors: Robert Ernest Arthur Dear, Mount Kisco; Eduard Karl Kleiner, New York, both of N.Y.

[73] Assignee: Ciba-Geigy Corporation, Ardsley, N.Y.

[22] Filed: Feb. 4, 1974

[21] Appl. No.: 439,498

[52] U.S. Cl.......... 260/609 R; 260/609 R; 260/516; 260/535 P; 260/590; 260/594; 260/54 R; 260/347.2; 260/482 C; 260/518 R; 260/471 C; 260/534 R

[51] Int. Cl.$^2$...................................... C07C 149/18

[58] Field of Search.......... 260/609 R, 609 F, 609 B

[56] References Cited
UNITED STATES PATENTS
3,717,618   2/1973   Oswald............................ 260/609 B

OTHER PUBLICATIONS

J. Org. Chem., Vol. 23, pp. 551–554.

*Primary Examiner*—Lewis Gotts
*Assistant Examiner*—D. R. Phillips
*Attorney, Agent, or Firm*—Luther A. R. Hall

[57] ABSTRACT

Bisthioalkyl alcohols, glycols and derivatives thereof can be prepared by the free radical catalyzed addition of a thiol to an acetylenic alcohol or ester. The novel bisthioalkyl glycols are useful, among other things, as synergists for antioxidants and as intermediates in the manufacture of antioxidants.

13 Claims, No Drawings

BISTHIOALKYL GLYCOLS

BACKGROUND OF THE INVENTION

The attempts of prior artisans to add thiols to acetylenic monoalcohols and to mono and diesters has been attended by low yields, excessive by-product formation or unreasonably long reaction periods to effect complete reaction. References to this effect include 1. K. Yamagishi, T, Tanaka and T. Hoshino, Bull. Chem. Soc. Japan, 29, 447 (1956);
2. A. T. Blomquist and J. Wolinsky, J. Org. Chem. 23, 551 (1958);
3. T. Tanaka, Sci. Repts. Sanitama Univ. Ser A., 3, 211-22 (1960)

DESCRIPTION OF THE INVENTION

This invention relates to novel bisthioalkyl glycols and to an improved process for the preparation of bisthioalkyl alcohols, glycols and derivatives thereof, notably the esters.

In one aspect, this invention relates to a method for making a bisthioalkyl alcohol, glycol or ester having two sulfide groups per molecule which comprises reacting, at a temperature of 40° to 100°C, in the presence of an azo-type free radical catalyst, from 2.0 to 2.5 moles of a thiol of formula $$R_1-SH$$

where
 $R_1$ is straight or branched chain alkyl of 1 to 24 carbon atoms, phenyl, naphthyl or said alkyl, phenyl or naphthyl substituted by hydroxyl, carboxyl, alkoxycarbonyl of 2 to 24 carbon atoms, phenylalkoxycarbonyl of 8 to 24 carbon atoms, naphthoxycarbonyl, phenyl, phenyl substituted by 1 to 3 of chloro, bromo, hydroxy, alkyl of 1 to 24 carbon atoms, phenoxy, phenylthio, phenyl, phenylalkylene of 7 to 24 carbon atoms, alkylphenylene of 7 to 24 carbon atoms, carboxyl, alkoxycarbonyl of 2 to 24 carbon atoms, phenoxycarbonyl, and phenylalkoxycarbonyl of 8 to 24 carbon atoms,
 amino, amino substituted by one or two of alkyl of 1 to 24 carbon atoms, phenyl, alkylphenylene of 7 to 24 carbon atoms or phenylalkylene of 7 to 24 carbon atoms,
 furfuryl, carbamyl or carbamyl substituted by one or two of alkyl of 1 to 24 carbon atoms, hydroxyalkyl of 1 to 24 carbon atoms, phenylalkylene of 7 to 24 carbon atoms, phenyl, and alkylphenylene of 7 to 24 carbon atoms;

with 1 mol. of an acetylenic compound of formula $$R_5-C \equiv C-R_2-O-R_4$$

where
 $R_5$ is hydrogen, straight or branched chain alkyl of 1 to 12 carbon atoms or a group of formula $$-R_3-O-R_4$$

$R_2$ and $R_3$ each independently are straight or branched chain alkylene of 1 to 12 carbon atoms; alkylene of 1 to 12 carbon atoms substituted by 1 or 2 of phenyl, and cyclohexyl, or a group of formula $$C_mH_{2m}(OC_kH_{2k})_r$$

where $m$ is an integer from 1 to 12,
$k$ is an integer from 2 to 6, and
$r$ is an integer from 1 to 40;
$R_4$ is hydrogen; alkyl of 1 to 24 carbon atoms, phenyl, naphthyl, phenyl or naphthyl substituted by 1 to 3 of chloro, bromo, alkyl of 1 to 6 carbon atoms alkoxy of 1 to 6 carbon atoms or alkanoyl or alkanoylamino of 2 to 6 carbon atoms; alkanoyl of 1 to 24 carbon atoms; alkanoyl of 1 to 24 carbon atoms substituted by phenyl or naphthyl, said phenyl or naphthyl being unsubstituted or substituted by 1 to 3 of chloro, bromo, alkyl of 1 to 6 carbon atoms or alkoxy of 1 to 6 carbon atoms; benzoyl or benzoyl substituted by 1 to 3 of chloro, bromo, alkyl of 1 to 6 carbon atoms; alkoxy of 1 to 6 carbon atoms and alkanoyl of 1 to 6 carbon atoms; or 1,2-epoxy alkyl of 3 to 6 carbon atoms.

In another aspect, the invention relates to bisthioalkyl glycols of formula $$R_1-S-CH-R_2-OH$$
$$R_1-S-CH-R_3-OH$$

where
 $R_1$, $R_2$ and $R_3$ are as previously defined.

Useful bisthioalkyl glycols include those where $R_1$ is alkyl of 6 to 18 carbon atoms or said alkyl substituted by phenyl, chlorophenyl, alkylphenylene of 7 to 18 carbon atoms, alkoxycarbonyl of 2 to 20 carbon atoms, amino, amino substituted by 1 or 2 of alkyl of 1 to 4 carbon atoms or hydroxyalkyl of 1 to 4 carbon atoms, or where the alkyl substituent is furfuryl, carboxyl or hydroxyl.

Preferred bisthioalkyl glycols are those where $R_1$ is alkyl of 6 to 18 carbon atoms or alkoxycarbonyalkylene of 6 to 21 carbon atoms and $R_2$ and $R_3$ are each independently a straight or branched chain alkylene of 1 to 4 carbon atoms or a group of formula $$C_mH_{2m}(OC_kH_{2k})_r$$

where
 $m$ is an integer from 1 to 4;
 $k$ is an integer from 2 to 4, and
 $r$ is an integer from 1 to 20

Compounds that are particularly preferred are those in which $R_2$ and $R_3$ are both alkylene of 1 or 2 carbon atoms or a group of formula $$C_mH_{2m}(OH_kH_{2k})$$

where
 $m$ is an integer from 1 to 2;
 $k$ is an integer 2, and
 $r$ is an integer from 1 to 20

Compounds that are especially preferred are those in which $R_1$ is alkyl of 6 to 18 carbon atoms and especially where $R_1$ is alkyl of 6 ton 18 carbon atoms and $R_2$ and $R_3$ are both alkylene of 1 or 2 carbon atoms.

As indicated, the compounds described herein can be obtained by the free radical catalyzed addition reaction of a thiol of formula $$R_1-SH \text{ with an acetylenic compound of formula}$$

$$R_5-C \equiv C-R_2-O-R_4$$

or $$R_4—O—R_3—C \equiv C—R_2—O—R_4$$

where $R_1$, $R_2$, $R_3$, $R_4$ and $R_5$ are as previously described.

In the case when the acetylenic compound of formula $$R_4—O—R_3—C \equiv C—R_2—O—R_4$$

is used, $R_2$ and $R_3$ each preferably is a straight or branched chain alkylene of 1 to 6 carbon atoms; said alkylene substituted by 1 or 2 of phenyl, or cyclohexyl, or a group of formula $$C_mH_{2m}(OC_kH_{2k})$$

where $m$ is an integer from 1 to 4;
$k$ is an integer from 2 to 4, and
$r$ is an integer from 1 to 20 and
$R_4$ is as previously defined, in the presence of from 0.5 to 20 percent of a mol of an azo-type free radical catalyst.

In a preferred embodiment of this configuration, the acetylenic compounds have the formula $$R_6-\underset{\underset{R_7}{|}}{\overset{\overset{OH}{|}}{C}}-C \equiv C-\underset{\underset{R_8}{|}}{\overset{\overset{OH}{|}}{C}}-R_9$$

where $R_6$, $R_7$, $R_8$ and $R_9$ are selected from hydrogen, alkyl of 1 to 4 carbon atoms, cyclohexyl, and phenyl.

In a particularly preferred embodiment, $R_6$, $R_7$, $R_8$ and $R_9$ are each hydrogen or alkyl of 1 to 4 carbon atoms. Especially preferred is the case where $R_6$, $R_7$, $R_8$ and $R_9$ are selected from hydrogen, and alkyl of 1 to 3 carbon atoms.

In another preferred embodiment, $R_7$ and $R_8$ are each hydrogen and $R_6$ and $R_9$ are selected from hydrogen, and alkyl of 1 to 4 carbon atoms.

Physical constants for some of the compounds described above are as follows:

| $R_6$ | $R_7$ | $R_8$ | $R_9$ | °C |
|---|---|---|---|---|
| H | H | H | H | MP 58° |
| CH$_3$ | H | H | CH$_3$ | BP 126–128° at 18mm |
| (CH$_3$)$_2$CH | H | H | (CH$_3$)$_2$CH | MP 69° |
| (CH$_3$)$_2$CH—CH$_2$ | H | H | (CH$_3$)$_2$CH—CH$_2$ | BP 158–160° at 15mm |
| C$_6$H$_{13}$ | H | H | C$_6$H$_{13}$ | BP 205° at 18mm |
| C$_6$H$_5$ | H | H | C$_6$H$_5$ | MP 12° |
| CH$_2$=CH— | H | H | CH$_2$=CH— | BP 146° at 15mm |
| CH$_3$—CH=CH— | H | H | CH$_3$—CH=CH— | MP 90–92° |
| C$_6$H$_5$—CH=CH— | H | H | C$_6$H$_5$—CH=CH— | MP 162° |
| CH$_3$ | CH$_3$ | CH$_3$ | CH$_3$ | MP 95° |
| C$_2$H$_5$ | CH$_3$ | CH$_3$ | C$_2$H$_5$ | BP 155–160° at 18mm |
| C$_2$H$_5$ | C$_2$H$_5$ | C$_2$H$_5$ | C$_2$H$_5$ | MP 74° |
| C$_3$H$_7$ | CH$_3$ | CH$_3$ | C$_3$H$_7$ | MP 56°–58° |
| C$_3$H$_7$ | C$_3$H$_7$ | C$_3$H$_7$ | C$_3$H$_7$ | MP 120° |
| C$_6$H$_5$ | CH$_3$ | CH$_3$ | C$_6$H$_5$ | MP 163° |
| C$_6$H$_5$ | C$_6$H$_5$ | C$_6$H$_5$ | C$_6$H$_5$ | MP 183° |

Reference:
"Acetylene Homologs and Derivatives" by Prof. Pierre Piganiol, Pages 295-300, Mapleton House Publishers, Brooklyn, N.Y. Copyright 1950.

The acetylenic compounds where the substituents are such unsaturated groups as vinyl, allyl and styryl are not preferred because these groups compete for the thiol and yield less desirable by-products.

Compounds where $R_2$ and $R_3$ are $C_mH_{2m}(OC_kH_{2k})_r$- can be made in several ways. For example, the bisthioalkyl glycols where $R_4$ is hydrogen can be reacted with a suitable alkylene oxide, such as ethylene oxide, propylene oxide, etc., in the presence of an acidic or basic catalyst. Alternatively, the original acetylenic diols themselves can be converted to the hydroxyalkyl esters, followed by free radical addition of the thiol $$R_1—SH$$

Similarly, the esters can be made by alternate routes. The bisthioalkyl glycol can be esterified by well-known synthetic organic methods, such as treatment of the bisthioalkyl glycol with a carboxylic acid anhydride, an acyl halide or a carboxylic acid. Alternately, the thiols $R_1$—SH can be added to the acetylenic ester.

The ethers can be prepared by the Williamson synthesis and the well-known variations thereof.

The epoxides can be prepared by reaction with an appropriate halohydrin, such as epichlorohydrin.

For additional insight into the chemistry of acetylenic compounds, one might consult "Chemistry of Acetylenes" by H. G. Viehe, Marcel Dekker, Inc., N.Y. 1969 and "Acetylenes and Allenes" by T. F. Rutledge, Reinhold Book Corp., 1969.

The following acetylenic diols and esters are commercially available:

2-butyn-1,4-diol
3,4-dimethyl-1-pentyn-3,4-diol
2,5-dimethyl-3-hexyn-2,5-diol
3-hexyn-2,5-diol
3,6-diethyl-4-octyn-3,6-diol
2,6-dimethyl-4-octyn-3,6-diol
2,3,6,7-tetramethyl-4-octyn-3,6-diol
4,7-dimethyl-5-decyn-4,7-diol
2,4,7,9-tetramethyl-5-decyn-4,6-diol
2,4,7,9-tetramethyl-5-decyn-4,7-diol
ethylene oxide adducts of 2-butyn-1,4-diol
1,1,4,4-tetraphenyl-2-butyn-1,4-diol
2-butynediol diacetate Monoalcohols, and monoesters can be prepared in a manner analogous to the glycols. Thus, a thiol of formula $$R_1—SH$$

can be reacted with an acetylenic compound of formula $$R_5—C \equiv C—R_2—O—R_4$$

where $R_5$ is straight or branched chain alkyl of 1 to 12 carbon atoms, or hydrogen and where
$R_3$ is branched or straight chain alkylene of 1 to 12 carbon atoms, to obtain the monoalcohol or ester of formula $$R_1-S-CH-R_3-O-R_4$$
$$R_1-S-CH-R_5$$

Acetytenic monoalcohols useful herein include propargyl alcohol
2-butyn-1-ol
3-butyn-1-ol
3-butyn-2-ol
2-methyl-3-butyn-2-ol
3,4-dimethyl-1-pentyn-3-ol
3-ethyl-1-pentyn-3-ol
2-methyl-3-pentyn-2-ol
3-methyl-1-pentyn-3-ol
4-methyl-1-pentyn-3-ol
1-pentyn-3-ol
2-pentyn-1-ol
3-pentyn-1-ol
3-pentyn-2-ol
4-pentyn-1-ol
4-pentyne-2-ol
3-isopropyl-3-hydroxy-4-methyl-1-pentyn
3,4,4-trimethyl-1-pentyn-3-ol
3-isobutyl-5-methyl-3-hydroxy-1-hexyne
3,5-dimethyl-1-hexyn-3-ol
4-ethyl-1-hexyn-3-ol
1-hexyn-3-ol
2-hexyn-1-ol
3-hexyn-1-ol
3-hexyn-2-ol
4-hexyn-2-ol
5-hexyn-1-ol
5-hexyn-3-ol
2-methyl-3-hexyn-2-ol
3-methyl-1-hexyn-3-ol
3-methyl-4-hexyn-3-ol
3,6-dimethyl-1-heptyn-3-ol
3-ethyl-1-heptyn-3-ol
3-ethyl-5-methyl-1-heptyn-3-ol
1-heptyn-3-ol
2-heptyn-1-ol
3-heptyn-1-ol
4-heptyn-2-ol
5-heptyn-3-ol
3-methyl-4-heptyn-3-ol
4-methyl-1-heptyn-3-ol
4-methyl-1-heptyn-4-ol
4-ethyl-1-octyn-3-ol
3-methyl-1-nonyn-3-ol
2-nonyn-1-ol
3-nonyn-1-ol
5-nonyn-3-ol
2-decyn-1-ol
3-decyn-1-ol
3-methyl-1-dodecyn-3-ol Among the thiols of formula $$R_1-SH$$

useful herein, are the straight and branched chain alkyl thiols containing 1 to 24 carbon atoms, represented by

| | |
|---|---|
| methanethiol | $CH_3SH$ |
| ethanethiol | $CH_3CH_2SH$ |
| 2-propanethiol | $(CH_3)_2CHSH$ |
| 1-propanethiol | $CH_3(CH_2)_2SH$ |
| 2-butanethiol | $CH_3CH_2CH(CH_3)SH$ |
| 2-methyl-1-propanethiol | $(CH_3)_2CHCH_2SH$ |
| 1-butanethiol | $CH_3(CH_2)_3SH$ |
| t-butanethiol | $(CH_3)_3CSH$ |
| 2-methyl-2-butanethiol | $CH_3CH_3C(CH_3)_2SH$ |
| 3-methyl-2-butanethiol | $(CH_3)_2CHCH(CH_3)SH$ |
| t-pentanethiol | $C_5H_{11}SH$ |
| 1-hexanethiol | $CH_3(CH_2)_5SH$ |
| cyclohexanethiol | $C_6H_{11}SH$ |
| 1-heptanethiol | $CH_3(CH_2)_6SH$ |
| 1-octanethiol | $CH_3(CH_2)_7SH$ |
| t-octanethiol | $C_8H_{17}SH$ |
| 1-decanethiol | $CH_3(CH_2)_9SH$ |
| 1-dodecanethiol | $CH_3(CH_2)_{11}SH$ |
| t-dodecanethiol | $C_{12}H_{25}SH$ |
| tridecanethiol | $C_{13}H_{27}SH$ |
| tetradecanethiol | $C_{14}H_{29}SH$ |
| t-tetradecanethiol | $C_{14}H_{29}SH$ |
| hexadecanethiol | $C_{16}H_{33}SH$ |
| t-hexadecanethiol | $C_{16}H_{33}SH$ |
| octadecanethiol | $C_{18}H_{37}SH$ |

In addition to the unsubstituted alkyl thiols, there can be used the aromatic substituted aromatic and substituted alkyl thiols, where the substituent is hydroxy, carboxyl, alkoxycarbonyl, phenyl, alkoxycarbonyl, naphthylalkoxycarbonyl, phenoxycarbonyl, naphthoxycarbonyl, phenyl, substituted phenyl, amino, substituted amino, furfuryl, carbamyl and substituted carbamyl. These substituents have been described with greater particularity above and are represented by compounds such as

| | |
|---|---|
| Benzyl Mercaptan (α' Toluenethiol) | $HS-CH_2-\langle\text{Ph}\rangle$ |
| n-Butyl 3-Mercaptopropionate | $HS-CH_2CH_2COO(C_4H_9)$ |
| n-Butyl Thioglycolate | $HS-CH_2COO(C_4H_9)$ |
| p-Chlorobenzyl Mercaptan | $HS-CH_2-\langle\text{Ph}\rangle-Cl$ |
| 2-Diethylaminoethanethiol Hydrochloride | $HS-CH_2CH_2N(C_2H_5)_2 \cdot HCl$ |
| Di-isopropylaminoethanethiol Hydrochloride | $HS-CH_2CH_2N(C_3H_7)_2 \cdot HCl$ |
| 2-Dimethylaminoethanethiol Hydrochloride | $HS-CH_2CH_2N(CH_3)_2 \cdot HCl$ |
| Dimethylaminopropanethiol | $HS-CH_2CH_2CH_2N(CH_3)_2 \cdot HCl$ |
| Dodecylbenzyl Mercaptan | $HS-CH_2-\langle\text{Ph}\rangle-C_{12}H_{25}$ |
| Dodecyl 3-Mercaptopropionate | $HS-CH_2CH_2COO(C_{12}H_{25})$ |
| Dodecyl Thioglycolate | $HS-CH_2COO(C_{12}H_{25})$ |
| Ethyl Thioglycolate | $HS-CH_2COOC_2H_5$ |
| Furfuryl Mercaptan | $HS-CH_2-\langle\text{furyl}\rangle$ |
| Isooctyl 3-Mercaptopropionate | $HS-CH_2CH_2COO(C_8H_{17})$ |
| Isooctyl Thioglycolate | $HS-CH_2COO(C_8H_{17})$ |
| 2-Mercaptoethylamine Hydrochloride | $HS-CH_2CH_2NH_2 \cdot HCl$ |
| 3-Mercaptopropionic Acid | $HS-CH_2CH_2COOH$ |
| Methyl 3-Mercaptopropionate | $HS-CH_2CH_2COOCH_3$ |
| Methyl Thioglycolate | $HS-CH_2COOCH_3$ |
| Monoethanolamine Thioglycolate | $HS-CH_2COONH_3CH_2CH_2OH$ |
| Octadecyl 3-Mercaptopropionate | $HS-CH_2CH_2COO(C_{18}H_{37})$ |
| Octadecyl Thioglycolate | $HS-CH_2COO(C_{18}H_{37})$ |
| 1-Thiolactic | $\begin{array}{l}CH_2-SH\\CHOH\\CH_2OH\end{array}$ |
| Thioglycolic Acid | $HS-CH_2COOH$ |
| Thiolacetic Acid (2-Mercaptopropionic Acid) | $\begin{array}{l}HS-CHCOOH\\ \quad\quad\, CH_3\end{array}$ |
| Thiomalic Acid | $\begin{array}{l}HS-CHCOOH\\ \quad\quad\, CH_2COOH\end{array}$ |
| Tridecyl Thioglycolate | $HS-CH_2COO(C_{13}H_{27})$ |
| Tridecyl 2-Mercaptopropionate | $HS-CH_2CH_2COO(C_{13}H_{27})$ |

Additional thiols include benzenethiol, p-tert.-butylbenzenethiol, o-amino-benzenethiol, 2-amino-4-chlorobenzenethiol, p-chlorobenzenethiol, o-mercaptobenzoic acid, 2-mercaptoacetanilide, o-,m- and p-toluenethiol, toluene-3,4-dithiol, 2,4-xylenethiol, 4,5-dimethyl-o-xylene-α,α-dithiol, 1-naphthalenethiol, 2-naphthalenethiol.

The process of this invention involves the combination of a. from 0.5 to 20 percent of a mole of an azo-type free radical catalyst;
b. moderate reaction temperatures, on the order of 40° to 100°C; and
c. A mole ratio of thiol to acetylenic alcohol or ester of from 2.0 to 2.5 moles of thiol per mole of acetylenic compound.

It is particularly preferred to use from about 1 to about 10 percent of a mole of azo-type free radical catalyst.

The reaction temperature and choice of azo-type free radical catalyst are considered to be mutually dependent. The temperature range of 40° to 100°C is one wherein the formation of undesirable by-products is minimized and wherein the reaction products are stable. In order to achieve a reasonable reaction rate at these temperatures, it is desirable to use an azo-type catalyst that is reactive to a reasonable extent in this temperature range. It is therefore preferred to use an azo-type free radical catalyst having a 1-hour half-life temperature of 40° to about 100°C. These compounds are listed below.

| Compound | 1 Hr. Half-Life Temperature °C |
|---|---|
| 2-t-butylazo-2-hydroperoxy-4-methylpentane | 45°C |
| 2-t-butylazo-2-cyano-4-methoxy-4-methylpentane | 74°C |
| di-t-butyl-4,4'-azobis-(4-cyano-peroxyvalerate) | 80°C (azo) |
| azobisisobutryonitrile | 81°C |
| 2-t-butylazo-2-cyano-4-methylpentane | 88°C |
| 4-t-butylazo-4-cyanovaleric acid | 93°C(trichlorobenzene) |
| 1,3-dimethyl-3-(t-butylperoxy)-butyl-4-t-butylazo-4-cyanovalerate | 94°C (azo) |
| t-butyl peroxy-4-t-butylazo-4-cyanovalerate | 94°C (azo) |
| ethylene bis(4-t-butylazo-4-cyano-valerate) | 94°C |
| 2-(t-butylazo) isobutyronitrile | 97°C |
| 4-(4-t-butylazo-4-cyanovaleryloxy)-2-hydroxybenzophenane | 100°C |
| 2-t-butylazo-2-cyanobutane | 104°C |

Other azo-type free radical catalysts are known but, because of their higher 1-hour half-life temperatures, are less preferred.

It is preferred to use an azo compound having a 1-hour half-life of from about 75°C to about 90°C and a reaction temperature of from about 60°C to about 80°C. Because of the ease of availability, it is preferred to use azobisisobutyronitrile as the catalyst.

The reaction can be carried out in bulk or in a suitable inert medium which acts to disperse or dissolve the reactants. The bulk reaction, without a solvent medium, is usually preferred. However, if solvents are used, useful solvents include ketones, such as acetone, methyl ethyl ketone, and methyl isobutyl ketone; esters such as ethyl acetate, butyl acetate, 2-ethylhexyl acetate; hydrocarbons, including such alkane hydrocarbons as the hexane, heptane, octane, higher homologs and cyclohexane, such aromatic hydrocarbons as benzene, toluene, xylenes; blends of aliphatic, cycloaliphatic and aromatic hydrocarbons; alcohols such as ethanol, n-propanol, isopropanol, t-butanol and methyl cellosolve; ethers, both aliphatic and alicyclic including di-n-propyl ether, di-butyl ether and tetrahydrofuran. In addition, chlorinated solvents such as di-chloroethyl ether, ethylene dichloride, perchloroethylene and carbon tetrachloride can be employed.

Using the reaction parameters indicated above, and continuing until reaction is complete, usually after 6 to 10 hours using azobisisobutronitrile at 75°C, there can be effected an 85 to 95 percent conversion of the thiol to the desired bisthioalkyl alcohol, glycol or ester. Further, the overall yield can be increased because unreacted thiol can be recovered and recycled. Since the addition products are generally poorly soluble in aliphatic and aromatic hydrocarbon solvents, and the thiols are soluble in these solvents, the unreacted thiol can be recovered by washing the product with a solvent such as benzene, heptane and the like.

The formation of the bisthioalkyl alcohols glycols and esters proceeds via the formation of intermediates which may be present as by-products in the ultimate material. These intermediates have the formula

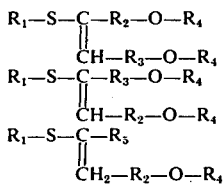

The formation of these intermediates is consistent with the general mechanism for the free radical addition of thiols to acetylenes. By use of the reaction conditions described above, it is possible to minimize the amount of said intermediates in the recovered reaction product.

The bisthioalkyl alcohols and glycols are useful, among other things as intermediates to manufacture esters of hindered phenolic carboxylic acids of general formula

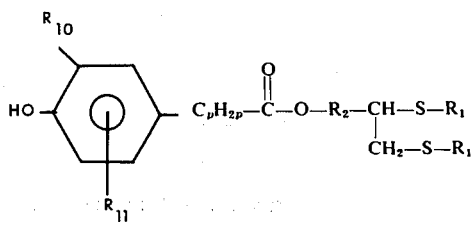

and

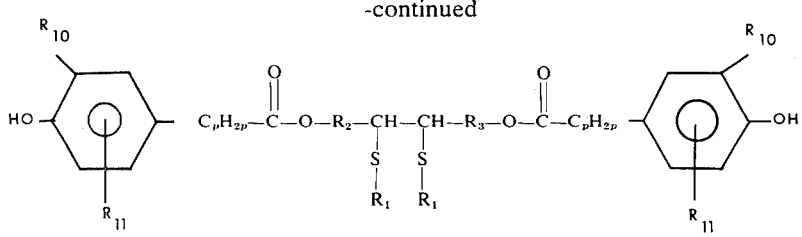

where
- $R_1$, $R_2$ and $R_3$ are as previously defined
- $R_{10}$ and $R_{11}$ each is selected from lower alkyl of 1 to 6 carbon atoms such as methyl, ethyl, isopropyl and t-butyl
- p is an integer from 0 to 6, preferably 0 to 2.

The esterification is effected under conventional and well-known reaction conditions. The esters are highly effective antioxidants for organic materials subject to oxidative deterioration such as lubricating oils, waxes, greases, soaps, cutting fluids, synthetic ester lubricants, natural and synthetic rubbers and synthetic polymers such as those derived from vinyl halide, styrene, alkylenedienes such as butadiene and isoprene, α-olefins such as polyethylene and polypropylene.

The esters described above are typically employed in an amount of from 0.01 to about 5 percent by weight of stabilized composition, usually from 0.05 to about 2 percent and can be incorporated before or after polymerization or during fabrication or processing steps e.g., hot milling, extrusion etc.

The antioxidant compounds described above can be used in conjunction with other materials normally used with the organic materials such as dyes, pigments, chelating agents, heat and light stabilizers, antiozonants, plasticizers, emulsifiers, antifoaming agents, corrosion and rust inhibitors, pour point depressants, detergents and emulsifiers and the like.

The efficacy of antioxidant compositions is evaluated as follows: unstabilized polypropylene power (Hercules Profax 6501) is thoroughly blended with 0.2 percent by weight of stabilizer. The blended material is milled on a two-roll mill at 182°C for 10 minutes, at which point the stabilized polypropylene is sheeted from the mill and allowed to cool.

The milled polypropylene sheets are then cut into pieces and pressed for 7 minutes on a hydraulic press at 218°C, 2,000 psi (140 kg/cm²). The resulting plaques of 25 mil thickness are tested for resistance to accelerated aging in a forced draft oven at 150°C. When the plaques show the first signs of decomposition, such as cracking or brown edges, they are considered to have failed.

Unstabilized polypropylene fails in about 3 hours. Polypropylene stabilized with a composition as described above, namely 2,3-bis(dodecylthio)-1-propyl-3'-[3'',5''-di-t-butyl-4''-hydroxyphenyl] propionate of formula

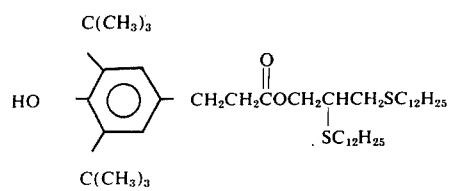

fails at the end of 645 hours.

The esters, the case when $R_4$ is acyl, can be used to prepare the above compositions by well-known transesterification techniques.

The ethers, obtained when $R_4$ is alkyl, aryl and the like, are useful as potentiators or synergists for conventional antioxidants, such as the hindered phenols.

The epoxides having one of two 1,2-epoxy groups per molecule are useful to prepare crosslinked epoxy resins by well-known methods.

The invention is further illustrated by the following exampels:

EXAMPLE 1

2,3-Bis(n-Dodecylthio)propan-1-ol

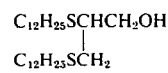

n-Dodecanethiol (300g; 1.48 mole) and propargyl alcohol (75.3g; 1.35 mole) were stirred together with the application of external heat in a 1 litre Morton flask, under nitrogen. After the temperature had stabilized at 75°, azobisisobutyronitrile catalyst (7.2g; 0.044 mole) was added in five equal portions of 1.44 g each over a 2 hour period. The reaction was continued for a further 6 hours (8 hours total) and the crude reaction mixture was purified by passage through a falling film molecular distillation apparatus at 160° and 0.02 mmHg. This procedure allowed the recovery of 35g unreacted dodecanethiol and 321g 2,3-bis(n-dodecylthio)prpan-1-ol. This represents a conversion of 88.3% and a yield of 94.9% based on thiol. A sample of the product was further purified by distillation at 200° and 0.01 mmHg. The infrared spectrum shows a broad O—H stretching frequency at 3437 cm$^{-1}$ and C—H stretching frequencies at 2954 cm$^{-1}$, 2929 cm$^{-1}$ and 2853 cm$^{-1}$. A further C—H band was present at 1465 cm$^{-1}$. The proton nmr spectrum further confirmed the identity of the product, showing peaks at 0.8–1.8 ppm (46H), $2xC_{11}H_{23}$; 2.45–3.0 ppm (8H), $3xCH_2S$, OH, CHS; 3.74 ppm (2H) $OCH_2$.

Elemental Analysis: calc'd for $C_{27}H_{56}OS_2$:%C70.37;%H12.25;%S13.91.
found:%C70.62;%H12.19;%S13.72.

EXAMPLE 2

2,3-Bis(n-Octylthio)propan-1-ol

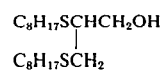

In a sealed ampoule, in 10 ml. heptane, n-octanethiol (10g; 0.068 mole) and propargyl alcohol (1.74g; 0.031 mole) were heated with azobisisobutyronitrile (0.22g; 0.0014 mole). The reaction was maintained at 70° for 20 hours. The crude product was distilled to give 9.2g 2,3-bis(n-octylthio)-propan-1-ol, b.p. 180° at 0.01 mmHg. Yield=85.2%. The infrared and nmr spectra were very similar to those of Example 1.

Elemental Analysis: calc'd for $C_{19}H_{40}OS_2$: %C65.45; %H11.56; %S18.39. found: %C65.84; %H11.70; %S18.70.

EXAMPLE 3

2,3-Bis(n-Octadecylthio)propan-1-ol

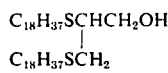

In the manner described in Example 2, n-octadecanethiol (10g; 0.035 mole) and propargyl alcohol (0.89g; 0.016 mole) were heated in 10 ml heptane with azobisisobutyronitrile (0.114g; 0.0007 mole). The crude product obtained after heating the ampoule to 70° for 18 hours was recrystallized from ethyl acetate, to give 2,3-bis(n-octadecylthio)propan-1-ol (8.1g; 80.5% yield), m.p. 52°–54°.

The infrared and nmr spectra were very similar to those of Examples 1 and 2.

Elemental Analysis: Calc'd for $C_{39}H_{80}OS_2$: C74.45; H12.82; S10.19. Found: C74.70; H13.16; S10.11.

EXAMPLE 4 to 16

The following examples show the wide variety of solvents which may be employed in the reaction.

In each Example, n-octanethiol (5g; 0.034 mole) was heated in an ampoule with propargyl alcohol (0.83g; 0.015 mole) azobisisobutyronitrile (0.112g; 0.0007 mole) and 10 ml solvent. After 18 hours at 75° the contents of each ampoule were examined by gas-liquid chromatography (GLC). The area % unreacted thiol, 2,3-bis(n-octylthio)-propan-1-ol and unknowns were calculated.

| Example | Solvent | $C_8H_{17}SCHCH_2OH$ \| $C_8H_{17}SCH_2$ | $C_8H_{17}SH$ | Unknowns* |
|---|---|---|---|---|
| 4 | Heptane | 84.2 | 15.3 | 0.5 |
| 5 | Acetone | 75.7 | 21.4 | 2.9 |
| 6 | 2-Butanone | 77.9 | 19.2 | 2.9 |
| 7 | Benzene | 77.9 | 18.4 | 3.7 |
| 8 | Toluene | 79.0 | 17.9 | 3.1 |
| 9 | o-Xylene | 79.7 | 17.1 | 3.2 |
| 10 | Perchloroethylene | 20.8 | 30.5 | 48.8** |
| 11 | Carbon Tetrachloride | 34.6 | 28.9 | 36.5** |
| 12 | 1,2-Dichloroethane | 80.0 | 17.8 | 2.2 |
| 13 | Ethyl Acetate | 81.6 | 15.9 | 2.5 |
| 14 | t-Butyl Alcohol | 78.9 | 18.3 | 2.8 |
| 15 | Isopropyl Alcohol | 89.0 | 19.0 | 2.0 |
| 16 | Methyl Cellosolve | 80.9 | 16.1 | 2.9 |

*mainly monoadduct, $C_8H_{17}SCH=CHCH_2OH$.
**In these cases the principal product was the disulfide, $(C_8H_{17}S)_2$.

It can be seen that those chlorinated hydrocarbons which contain more than one chlorine atom on the same carbon, notably perchloroethylene and carbon tetrachloride are less effective under the reaction conditions employed herein than are the other solvents.

EXAMPLE 17

2,3-Bis(n-Dodecylthio)butane-1,4-diol

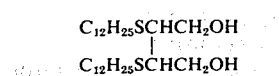

In a 500 ml Morton flask, n-dodecanethiol (300g; 1.48 mole) and 2-butyn-1,4-diol (60.8g; 0.71 mole) were stirred together, under nitrogen, at 75°, and azobisisobutyronitrile (24g; 0.146 mole) was added in 6 equal portions of 4g each, over a 4 hour period. The reaction was continued for 8 hours. The crude product was passed through a molecular distillation apparatus at 100° and 0.05 mmHg. This procedure gave 19.5g recovered thiol (6.5%) and 322g 2,3-bis(n-dodecylthio) butane-1,4-diol (92.4%). A sample of diol was purified further by recrystallization from ethanol and melted at 47°–48°.

Infrared spectrum showed O-H stretching frequency at 3355 cm$^{-1}$, C—H stretching frequencies at 2941, 2930 and 2853 cm$^{-1}$. A further C—H band was present at 1462 cm$^{-1}$.

Nmr showed signals at: 0.9 ppm(6H) 2xCH$_3$; 2.32 ppm(40OH) 2x(CH$_2$)$_{10}$; 2.65 ppm(4H) 2xSCH$_2$; 3.02(2H) 2xSCH; 3.20 ppm(2H) 2xOH; 3.88 ppm(4H) 2xOCH$_2$.

Elemental Analysis: Calc'd for $C_{28}H_{58}O_2S_2$: C68.51; H11.91; S13.06. Found: C68.72; H11.89; S13.18.

EXAMPLE 18

2,3-Bis(n-Octylthio)butane-1,4-diol

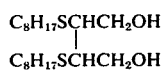

In a glass ampoule, n-octanethiol (10g; 0.068 mole) and 2-butyn-1,4-diol (2.71g; 0.032 mole) were sealed with azobisisobutyronitrile (1.12g; 0.0068 mole) and heated, with shaking at 75° for 10 hours. The resultant oil was distilled. The major fraction was 2,3-bis(n-octylthio)butane-1,4-diol boiling at 230° and 0.01 mmHg. Yield=9.6g (79.2%). The infrared and nmr spectra were very similar to those of the previous example.

Elemental Analysis: Calc'd for $C_{20}H_{42}O_2S_2$: C63.44; H11.18; S16.93. Found: C63.77; H11.46; S16.94.

EXAMPLE 19

2,3-Bis(n-Octadecylthio)butane-1,4-diol

In the manner described in Example 18, n-octadecanethiol (10g; 0.035 mole) and 2-butyn-1,4-diol(1.36g: 0.016 mole) were reacted under the influence of azobisisobutyronitrile (0.57g; 0.0035 mole). The crude product was recrystallized from isopropanol, giving 8.3g of 2,3-bis(n-octadecylthio) butane-1,4-diol, m.p. 59°–61°. Yield=78.7%. The structure of the compound was shown by infrared and nmr spectra, which closely resembled those of Example 17.

Elemental Analysis: Calc'd for $C_{40}H_{82}O_2S_2$:C72.88; H12.54; S9.73. Found: C72.95; H12.80; S9.68.

EXAMPLE 20:

2,3-Bis(n-Dodecylthio)butane-1,4-(polyhydroxyethyl)diol $$C_{12}H_{25}SCHCH_2(OCH_2CH_2)_nOH$$
$$C_{12}H_{25}SCHCH_2(OCH_2CH_2)_nOH$$

n = average 1

In a 300 ml Morton flask, n-dodecanethiol (142.9g; 0.71 mole) and the hydroxyethyl ether of 2-butyn-1,4-diol (51.6g; 0.321 mole if $n=1$) were heated and stirred under nitrogen at 75°. Azobisisobutyronitrile (11.64g; 0.071 mole) was added in equal portions over a 4 hour period and the reaction was continued at 75° for a total of 16 hours. The crude product at this stage weighed 190.1g and GLC analysis showed it to contain (area %) 16.2% thiol, 7.4% monoaddition product and 76.5% diaddition product. The mixture was purified by passing it twice through a molecular still at 130° and 0.005 mmHg. This gave 138.3g product, containing 9.78% monoaddition product and 90.22% diaddition product.

The infrared and nmr spectra confirmed the structural assignment.

Elemental Analysis: Calc'd (based on variation in n as shown by GLC) :C66.71; H11.55; S11.39. Found: C66.35; H11.19; S11.03. Molecular Weight (Hydroxyl titration) calc'd: 565 (n=1). found: 546.

EXAMPLE 21

2,3-Bis(n-Dodecylthio)butane-1,4-(polyhydroxyethyl)diol $$C_{12}H_{25}SCHCH_2(OCH_2CH_2)_nOH$$
$$C_{12}H_{25}SCHCH_2(OCH_2CH_2)_nOH$$

n = average 10

(56.5g; 0.1 mole) is added to a flask fitted with a mechanical stirrer, a gas inlet tube and a reflux condenser maintained at −78°C. Sodium hydroxide (1g; of 50% solution) is added as a catalyst and ethylene oxide gas passed into the flask at 90°–100° for a period of six hours. A total of 82g of ethylene oxide is absorbed, indicative of the formation of a polyether with an average structure of $$C_{12}H_{25}SCHCH_2(OCH_2CH_2)_{10}OH$$
$$C_{12}H_{25}SCHCH_2(OCH_2CH_2)_{10}OH$$

The product is a clear viscous oil at room temperature.

EXAMPLES 22–42

When two moles of the indicated thiol are reacted with 1 mole of the indicated acetylenic compound under the reaction conditions of Example 1, there is obtained the indicated product:

| Example | Thiol | Acetylene | Product |
|---|---|---|---|
| 22 | $C_{12}H_{25}SH$ | $HC\equiv C(CH_2)_2OH$ | $C_{12}H_{25}SCH(CH_2)_2OH$ / $C_{12}H_{25}SCH_2$ |
| 23 | $C_7H_{15}SH$ | $HC\equiv C(CH_2)_4OH$ | $C_7H_{15}SCH(CH_2)_4OH$ / $C_7H_{15}SCH_2$ |
| 24 | $C_8H_{17}SH$ | $HC\equiv CCH_2CHOHCH_3$ | $C_8H_{17}SCHCH_2CHOHCH_3$ / $C_8H_{17}SCH_2$ |
| 25 | $C_{10}H_{21}SH$ | $(CH_3)_2C(OH)C\equiv CH$ | $C_{10}H_{21}SCHC(OH)(CH_3)_2$ / $C_{10}H_{21}SCH_2$ |
| 26 | $C_4H_9OOCCH_2CH_2SH$ | $HC\equiv CCH_2OH$ | $C_4H_9OOCCH_2CH_2SCHCH_2OH$ / $C_4H_9OOCCH_2CH_2SCH_2$ |
| 27 | $C_6H_5CH_2SH$ | $HC\equiv CCH_2OH$ | $C_6H_5CH_2SCHCH_2OH$ / $C_6H_5CH_2SCH_2$ |
| 28 | $C_{12}H_{25}OOCCH_2SH$ | $HC\equiv CCH_2OH$ | $C_{12}H_{25}OOCCH_2SCHCH_2OH$ / $C_{12}H_{25}OOCCH_2SCH_2$ |
| 29 | $HOOCCH_2CH_2SH$ | $HC\equiv CCH_2OH$ | $HOOCCH_2CH_2SCHCH_2OH$ / $HOOCCH_2CH_2SCH_2$ |
| 30 | $CH_3OOCCH_2CH_2SH$ | $HOCH_2C\equiv CCH_2OH$ | $CH_3OOCCH_2CH_2SCHCH_2OH$ / $CH_3OOCCH_2CH_2SCHCH_2OH$ |
| 31 | $HOCH_2CH_2SH$ | $HOCH_2C\equiv CCH_2OH$ | $HOCH_2CH_2SCHCH_2OH$ / $HOCH_2CH_2SCHCH_2OH$ |
| 32 | 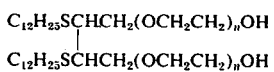 CH₂SH | $HC\equiv CCH_2OH$ | 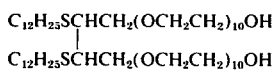 CH₂SCHCH₂OH / similar CH₂SCH₂ |
| 33 | $C_{18}H_{37}OOCCH_2CH_2SH$ | $HC\equiv CCH_2OH$ | $C_{18}H_{37}OOCCH_2CH_2SCHCH_2OH$ / $C_{18}H_{37}OOCCH_2CH_2SCH_2$ |
| 34 | $(C_2H_5)_2NCH_2CH_2SH$ | $HC\equiv CCH_2OH$ | $(C_2H_5)_2NCH_2CH_2SCHCH_2OH$ / $(C_2H_5)_2NCH_2CH_2SCH_2$ |
| 35 | $C_2H_5OOCCH_2SH$ | $HOCH_2C\equiv CCH_2OH$ | $C_2H_5OOCCH_2SCHCH_2OH$ / $C_2H_5OOCCH_2SCHCH_2OH$ |

-continued

| Example | Thiol | Acetylene | Product |
|---|---|---|---|
| 36 | HOOCCH$_2$SH | HOCH$_2$C≡CCH$_2$OH | HOOCCH$_2$SCHCH$_2$OH<br>\|<br>HOOCCH$_2$SCHCH$_2$OH |
| 37 | HOOCCH(CH$_3$)SH | HC≡CCH$_2$OH | HOOCCH(CH$_3$)SCHCH$_2$OH<br>\|<br>HOOCCH(CH$_3$)SCH$_2$ |
| 38 | C$_{13}$H$_{27}$OOCCH$_2$CH$_2$SH | HOCH$_2$C≡CCH$_2$OH | C$_{13}$H$_{27}$OOCCH$_2$CH$_2$SCHCH$_2$OH<br>\|<br>C$_{13}$H$_{27}$OOCCH$_2$CH$_2$SCHCH$_2$OH |
| 39 | C$_8$H$_{17}$SH | HC≡CCH$_2$OCOCH$_3$ | C$_8$H$_{17}$SCHCH$_2$OCOCH$_3$<br>\|<br>C$_8$H$_{17}$SCH$_2$ |
| 40 | C$_{12}$H$_{25}$SH | CH$_3$COOCH$_2$C≡CCH$_2$OCOCH$_2$ | C$_{12}$H$_{25}$SCHCH$_2$OCOCH$_3$<br>\|<br>C$_{12}$H$_{25}$SCHCH$_2$OCOCH$_3$ |
| 41 | HOCH$_2$CH$_2$SH | HC≡C(CH$_2$)$_2$OH | HOCH$_2$CH$_2$SCH(CH$_2$)$_2$OH<br>\|<br>HOCH$_2$CH$_2$SCH$_2$ |
| 42 | C$_6$H$_5$SH | HOCH$_2$C≡CCH$_2$OH | C$_6$H$_5$SCHCH$_2$OH<br>\|<br>C$_6$H$_5$SCHCH$_2$OH |

EXAMPLE 43

This example illustrates the preparation of esters of hindered alkyl phenols, which esters are useful as antioxdiants.

A reaction flask was charged with 10.82 grams (0.037 moles) of methyl 3-(3',5'-di-t-butyl-4'-hydroxyphenyl)-propionate, 16.13 grams (0.035 moles) of 2,3-bis(n-dodecylthio)-1-propanol, the compound of Example 1, 0.059 grams (0.007 moles) of lithium hydride and 2.0 ml of dry dimethyl sulfoxide. The reaction mixture was heated at 140°–150°C for 15½ hours at ambient pressure and then for an additional 3½ hours at about 1mm. At the end of this period, the catalyst was neutralized with glacial acetic acid (0.43 ml, 0.007 moles) and the product isolated by means of chromatography from silica gel. After drying to constant weight the product, which was a light yellow oil gave the following analysis:

Calculated for $C_{44}H_{80}O_3S_2C$, 73.26; H, 11.20; S, 8.89. Found C, 73.63; H, 11.47; S, 8.71.

What we claim is:

1. A compound of the formula $$R_1-S-CH-R_2-OH$$
$$R_1-S-CH-R_3-OH$$

wherein

R$_2$ and R$_3$ are each independently straight or branched alkylene of 1 to 12 carbon atoms; alkylene of 1 to 12 carbon atoms substituted by one or two of phenyl, lower alkyl of 1 to 4 carbon atoms or cyclohexyl; or a group of the formula $$C_mH_{2m}(OC_kH_{2k})_r$$

where m is an integer from 1 to 12,
k is an integer from 2 to 6, and
r is an integer from 1 to 40.

2. A compound according to claim 1 wherein
R$_1$ is alkyl of 6 to 18 carbon atoms, and
R$_2$ and R$_3$ are each independently straight or branched chain alkylene of 1 to 4 carbon atoms or a group of the formula $$C_mH_{2m}(OC_kH_{2k})_r$$

where
m is an integer from 1 to 4,
k is an integer from 2 to 4, and
r is an integer from 1 to 20.

3. A compound according to claim 2 wherein
R$_1$ is alkyl of 6 to 18 carbon atoms, and
R$_2$ and R$_3$ are both alkylene of 1 to 2 carbon atoms or a group of the formula $$C_mH_{2m}(OC_kH_{2k})_r$$

where
m is an integer from 1 to 2,
k is 2, and
r is an integer from 1 to 20.

4. A compound according to claim 2 wherein R$_1$ is a straight or branched chain alkyl of 6 to 18 carbon atoms.

5. A compound according to claim 2 wherein R$_2$ and R$_3$ are both alkylene of 1 or 2 carbon atoms.

6. A compound according to claim 5 wherein R$_1$ is alkyl of 6 to 18 carbon atoms.

7. A compound according to claim 2 wherein R$_2$ and R$_3$ are both a group of the formula $$C_mH_{2m}(OC_kH_{2k})_r$$

where
m is an integer from 1 to 2
k is 2, and
r is an integer from 1 to 20.

8. A compound according to claim 7 wherein R$_1$ is alkyl of 6 to 18 carbon atoms.

9. The compound according to claim 1 which is 2,3-bis(n-dodecylthio)-1,4-butanediol.

10. The compound according to claim 1 which is 2,3-bis(n-octylthio)-1,4-butanediol.

11. The compound according to claim 1 which is 2,3-bis(n-octadecylthio)-1,4-butanediol.

12. The compound according to claim 1 which is $$n-C_{12}H_{25}SCHCH_2(OCH_2CH_2)_nOH$$
$$n-C_{12}H_{25}SCHCH_2(OCH_2CH_2)_nOH$$

where n is an average of 1.

13. The compound according to claim 1 which is $$n-C_{12}H_{25}SCHCH_2(OCH_2CH_2)_nOH$$
$$n-C_{12}H_{25}SCHCH_2(OCH_2CH_2)_nOH$$

where n is an average of 10.

* * * * *

UNITED STATES PATENT OFFICE
CERTIFICATE OF CORRECTION

PATENT NO. : 3,914,319
DATED : October 21, 1975
INVENTOR(S) : Robert Ernest Arthur Dear, Eduard Karl Kleiner It is certified that error appears in the above—identified patent and that said Letters Patent are hereby corrected as shown below:

Column 15, line 49 (in claim 1) after "wherein" insert the following definition of $R_1$ -- $R_1$ is a straight or branched chain alkyl of 1 to 24 carbon atoms, phenyl, naphthyl or benzyl, or said alkyl, phenyl, naphthyl or benzyl being substituted by 1 to 3 of chloro, bromo, hydroxyl or alkyl of 1 to 24 carbon atoms, and --.

Signed and Sealed this sixth Day of January 1976

[SEAL]

Attest:

RUTH C. MASON
Attesting Officer

C. MARSHALL DANN
Commissioner of Patents and Trademarks